United States Patent

Edge et al.

[11] Patent Number: 6,108,442
[45] Date of Patent: Aug. 22, 2000

[54] CHARACTERIZATION OF COLOR IMAGING SYSTEMS

[75] Inventors: Christopher J. Edge, St. Paul; Timothy A. Fischer, Mendota Heights, both of Minn.

[73] Assignee: Minnesota Mining and Manufacturing Company, St. Paul, Minn.

[21] Appl. No.: 08/884,411

[22] Filed: Jun. 27, 1997

[51] Int. Cl.$^7$ .................. G06K 9/00; G03F 3/08
[52] U.S. Cl. ........................... 382/167; 358/518
[58] Field of Search ................ 382/162, 167; 358/518, 521

[56] References Cited

U.S. PATENT DOCUMENTS

| | | | |
|---|---|---|---|
| 3,612,753 | 10/1971 | Korman | 358/534 |
| 4,500,919 | 2/1985 | Schreiber | 358/518 |
| 4,566,798 | 1/1986 | Haas | 356/448 |
| 4,698,669 | 10/1987 | Sekizawa et al. | 358/509 |
| 4,739,313 | 4/1988 | Oudshoorn et al. | 345/154 |
| 4,884,130 | 11/1989 | Huntsman | 358/518 |
| 4,884,221 | 11/1989 | Sugiyama et al. | 382/165 |
| 4,926,251 | 5/1990 | Sekizawa et al. | 358/535 |
| 5,012,431 | 4/1991 | Stanziola | 382/162 |
| 5,105,267 | 4/1992 | Hayashi | 358/515 |
| 5,233,684 | 8/1993 | Ulichney | 345/431 |
| 5,268,754 | 12/1993 | Van De Capelle et al. | 358/527 |
| 5,317,678 | 5/1994 | Okawara et al. | 345/426 |
| 5,339,176 | 8/1994 | Smilansky et al. | 358/504 |
| 5,398,119 | 3/1995 | Suzuki et al. | 358/461 |
| 5,432,906 | 7/1995 | Newman et al. | 345/501 |
| 5,485,288 | 1/1996 | Kamei et al. | 358/530 |
| 5,506,696 | 4/1996 | Nakano | 358/504 |
| 5,526,285 | 6/1996 | Campo et al. | 356/405 |
| 5,531,520 | 7/1996 | Grimson et al. | 382/131 |
| 5,541,742 | 7/1996 | Imao et al. | 358/518 |
| 5,572,632 | 11/1996 | Laumeyer et al. | 395/116 |
| 5,668,890 | 9/1997 | Winkelman | 382/167 |
| 5,689,349 | 11/1997 | Plettinck et al. | 358/500 |
| 5,694,484 | 12/1997 | Cottrell et al. | 382/167 |
| 5,729,360 | 3/1998 | Kita et al. | 358/500 |
| 5,754,184 | 5/1998 | Ring et al. | 345/431 |
| 5,754,448 | 5/1998 | Edge et al. | 364/526 |
| 5,805,213 | 9/1998 | Spaulding et al. | 348/222 |
| 5,809,164 | 9/1998 | Hultgren, III | 382/162 |
| 5,844,699 | 12/1998 | Usami et al. | 358/518 |
| 5,848,182 | 12/1998 | Kanamori | 382/171 |

FOREIGN PATENT DOCUMENTS

| | | |
|---|---|---|
| 0 273 398 | 7/1988 | European Pat. Off. . |
| 0 484 102 | 5/1992 | European Pat. Off. . |
| 0 550 212 | 7/1993 | European Pat. Off. . |
| 0 562 971 | 9/1993 | European Pat. Off. . |
| WO 93/20648 | 10/1993 | WIPO . |

OTHER PUBLICATIONS

R.W.G. Hunt, "Revised Colour–Appearance Model for Related and Unrelated Colours," *Color Res. & Appl.*, vol. 16, pp. 146–165 (1991).

M. D. Fairchild and R. S. Berns, "Image Color–Appearance Specification Through Extension of CIELAB," *Color Res. & Appl.*, vol. 18, No. 3 (Jun. 1993).

M. D. Fairchild, "Visual Evaluation and Evolution of the RLAB Color Space," *Second IS&T/SID Color Imag. Conf.*, pp. 9–13, Scottsdale, AZ (Nov. 15–18, 1994).

(List continued on next page.)

*Primary Examiner*—Jon Chang
*Assistant Examiner*—Mehrdad Dastouri
*Attorney, Agent, or Firm*—William D. Bauer

[57] ABSTRACT

Characterizing a color imaging system involves generating color values representing colors of output samples of the color imaging system. The color values are converted into a device-independent color coordinate system using an adjustable white reference vector and a black reference vector. The white reference vector is calculated using the black reference vector. Color values can be transformed between color imaging systems using the device-independent color coordinate system.

58 Claims, 2 Drawing Sheets

OTHER PUBLICATIONS

M. R. Pointer and R.W.G. Hunt, "A Color Reproduction Index," *Second IS&T/SID Color Imaging Conference,* pp. 180–182, Scottsdale, Arizona (Nov. 15–18, 1994).

E.M. Granger, "A New Color Space for Image Appearance Equivalence," *Seybold Conference,* Boston, Massachusetts (Feb. 1992).

International Color Consortium, "International Color Profile Format," ISO/TC 130/WG2 N (Jun. 10, 1994).

ICC Profile Format Spec., Version 3.3, Int'l Color Consortium (Nov. 11, 1996).

G. Wyszecki and W.S. Stiles, "Chromatic Adaptation," Color Science, Concepts and Methods, Quantitative Data and Formulae, $2^{nd}$ Edition, pp. 429–450 (1982).

Stone et al., "Color Gamut Mapping and the Printing of Digital Color Images," *ACM Trans. on Graphics* 7(4), pp. 249–292 (Oct. 1988).

B.J. Lindblom, "Accurate Color Reproduction for Computer Graphics Applications," *Computer Graphics,* vol. 23, No. 3, Jul. 1989.

World Wide Web Sample Page from Numerical Recipes in C: The Art of Scientific Computing, Cambridge University Press, pp. 410–420, 1992.

Po–Chieh Hung, "Color Rendition Using Three–Dimensional Interpolation," *SPIE Imaging Applications in the Work World,* vol. 900, pp. 111–115 (Jan. 12–13, 1988, L.A., California.

Japanese abstract publication no. 09102885, publication date: Apr. 15, 1997, Ricoh Co. Ltd.

Japanese abstract publication no. 09147098, publication date: Jun. 6, 1997, NEC Corp.

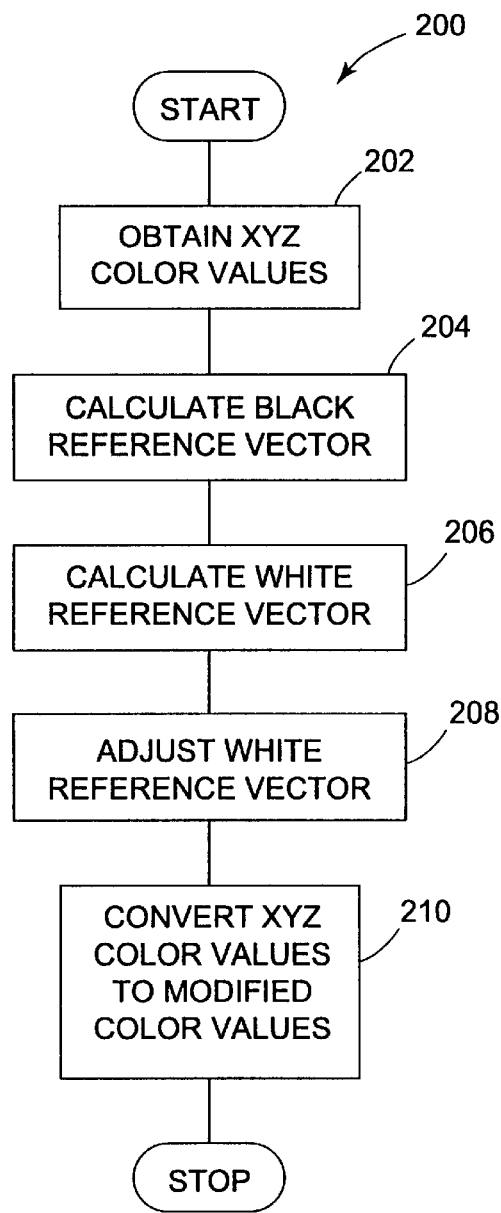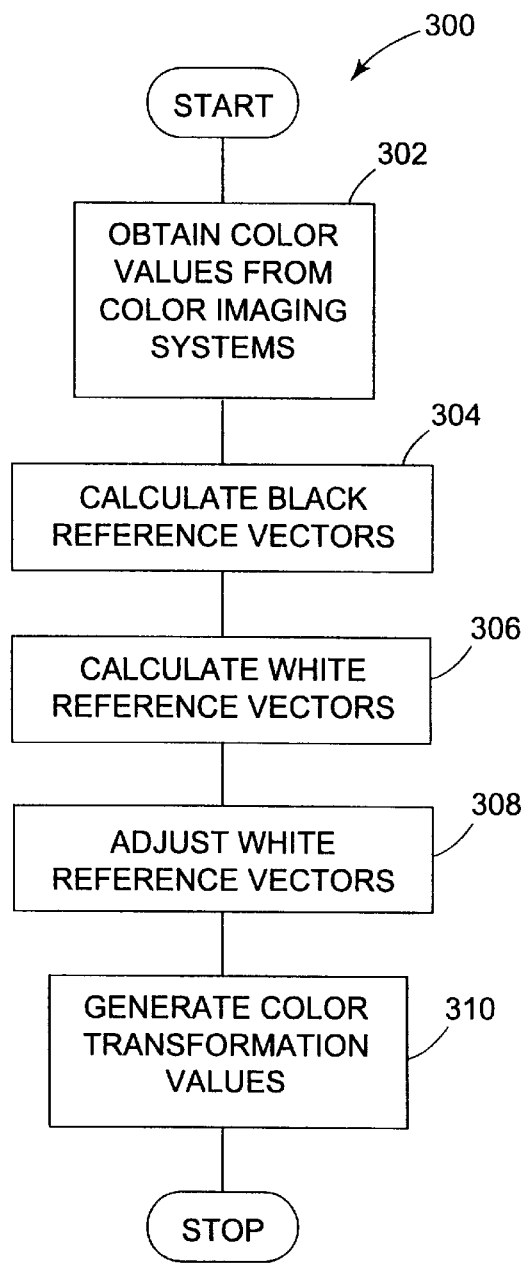
Fig. 2
Fig. 3

CHARACTERIZATION OF COLOR IMAGING SYSTEMS

FIELD OF THE INVENTION

The present invention relates to color imaging systems. More particularly, the present invention relates to characterizing color imaging systems to account for perceptual effects.

BACKGROUND OF THE INVENTION

Color reproduction processes typically involve using color imaging systems to produce colors on various media. These color imaging systems may be used to duplicate a color image from one medium to another medium, e.g., from one printed copy to another or from a display screen to a printed copy. Color reproduction processes are used in various application environments, for example, color proofing applications. In color reproduction processes, rendering colors similarly across different media is desirable. To reproduce colors accurately, many processes use color coordinate systems known as color spaces to characterize the color output of color imaging systems. One commonly-used color space is Commission Internationale de l'Éclairage (CIE) L*a*b* space.

Color spaces can also be used to characterize the color output of one color imaging system relative to other color imaging systems. Characterizing a color imaging system typically involves calculating a color response function for the color imaging system using the coordinates of the color space, e.g., the L*, a*, and b* coordinates of the CIE L* a* b* space.

Color characterization systems often attempt to account for psychophysical and other effects on human color perception. If inadequately addressed, these effects potentially introduce non-uniformities in color characterization across color imaging systems. These non-uniformities may result in differences in color appearance between different color imaging systems and decrease the accuracy of color characterization.

One psychophysical effect on human color perception, known as adaptation, involves the effect of surrounding colors on the subjective appearance of a color. For example, colors appear darker when viewed against relatively light backgrounds. Conversely, dark backgrounds cause colors to appear lighter than they actually are.

Many color imaging systems are used in connection with displaying colors against a nominally white background or white reference, such as paper or other media. Different color imaging systems may involve producing colors on media having different white references. The human eye perceives the different white references as white and other colors produced on the media relative to the respective white references. As a result, a single objective color is subjectively perceived differently against different backgrounds.

Some color characterization systems attempt to compensate for differences in white references by using transformations to modify tristimulus values based on the white reference. While such systems are effective in characterizing relative color within a single color imaging system, given a particular imaging medium and a particular set of viewing conditions such as illumination and viewing angle, many of these systems produce less accurate results when transforming colors between different color imaging systems. One problem inadequately considered by many color characterization systems is the effect of variations in white reference for different color imaging systems due to differences in the imaging substrate or display white point. For example, some color characterization systems that use the CIE L*a*b* color space produce non-uniformities in matching color proofing systems having different imaging substrate white reference. In particular, some such color characterization systems have been observed to produce severe non-uniformities when mapping from a substantially white imaging base to a somewhat blue-shifted imaging base.

Other color characterization systems using different color spaces have been observed to produce uniform mapping in light shades of colors, but less uniform mapping in more intense colors. As a result, after a transformation function has been generated to match color values between two color imaging systems, a human operator typically engages in significant empirical adjustment to obtain an acceptable visual match. This empirical adjustment is potentially labor-intensive and time-consuming.

Another psychophysical perceptual effect is known as black point adaptation. This phenomenon involves the perception of a near-black color as black despite the presence of stray light that imparts non-zero tristimulus values to the near-black color. This effect is particularly noticeable when a color characterization system attempts to characterize perceived colors on a computer monitor, where near-black colors appear black despite significant stray light that devices measure as having tristimulus values significantly higher than zero.

Other color imaging systems are also susceptible to perceptual effects attributable to black point adaptation. For example, using certain color characterization systems to simulate newspaper colors on opaque paper results in reproduced colors that appear washed out. This result is attributable to the significant non-zero tristimulus values for the darkest color or black reference formed on newsprint. These non-zero tristimulus values are partially attributable to stray light scattered from the coarse fibers and partially attributable to inadequate ink coverage of the newsprint. Many conventional color characterization systems fail to adequately compensate for black point adaptation.

SUMMARY OF THE INVENTION

According to one embodiment, the present invention is directed to a method for characterizing a color imaging system. The method includes obtaining first color values in a color coordinate system using output samples of the color imaging system. The first color values represent the colors of the output samples and are converted into second color values in a device-independent color coordinate system using first reference values, e.g., a white reference vector, and second reference values, e.g., a black reference vector. The first reference values are adjusted using the first color values. Another embodiments are directed to an arrangement and a data storage medium for performing this method.

According to another embodiment of the present invention, a color characterization method includes obtaining first color values in a color coordinate system. The first color values represent colors of output samples of the color imaging system and are converted into second color values in a device-independent color coordinate system. First and second reference values are used in the conversion process. The first reference values are calculated using the second reference values, which are calculated as a function of a medium. The first reference values are adjusted using the first color values.

According to a system embodiment of the present invention, color characterization is effected using a computer arrangement. The computer arrangement is configured and arranged to receive first color values in a color coordinate system. The first color values represent colors of output samples. A memory is responsive to the computer arrangement and is configured and arranged to store second color values in a device-independent color coordinate system. The computer arrangement is further configured and arranged to convert the first color values into the second color values using first and second reference values, the first reference values being adjusted using the second reference values.

Another aspect of the present invention is directed to a color transformation method for performing a color transformation between first and second color imaging systems. The color transformation method includes obtaining first and second color values respectively representing colors of output samples of the first and second color imaging systems. The first and second color values are respectively converted into third and fourth color values using a device-independent color coordinate system. First reference values are calculated from a medium, and second reference values are calculated from the first reference values. The second reference values are adjusted using the first and second color values. Color transformation values are generated using the third and fourth color values. The method may be performed by a color transformation arrangement.

The above summary of the invention is not intended to describe each disclosed embodiment of the present invention. This is the purpose of the figures and of the detailed description that follows.

BRIEF DESCRIPTION OF THE DRAWINGS

Other aspects and advantages of the present invention will become apparent upon reading the following detailed description and upon reference to the drawings in which:

FIG. 2 is a flow chart illustrating an example color characterization method, according to one embodiment of the present invention; and FIG. 3 is a flow chart illustrating a color transformation method, according to another embodiment of the present invention.

Figure 1:
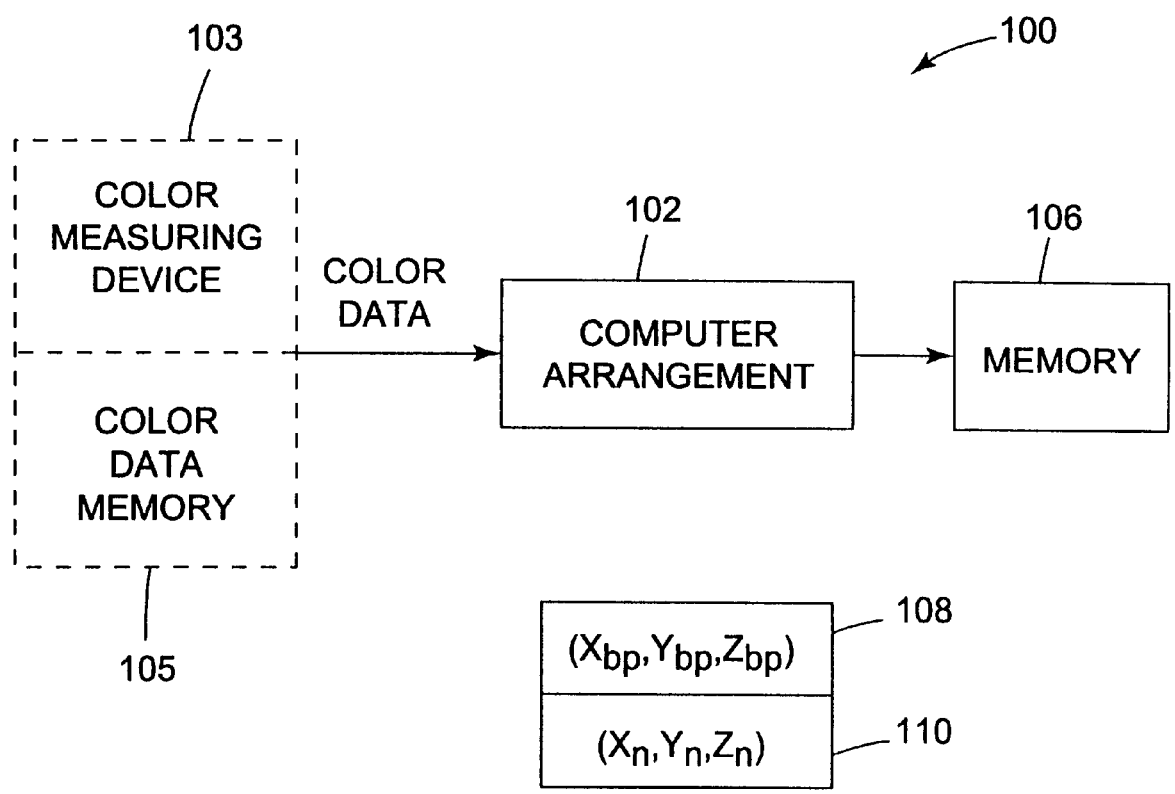
FIG. 1 is a block diagram illustrating a color characterization arrangement, according to one embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present invention is believed to be applicable to a variety of systems that characterize color imaging systems. The present invention has been found to be particularly advantageous for characterizing color imaging systems susceptible to certain perceptual effects and for transforming colors between color imaging systems. An appreciation of the invention is best gained through a discussion of these particular application examples.

According to one aspect of the present invention, a color characterization technique may be applied to a variety of color imaging systems to generate a characterization or profile of a color imaging system. The characterization may be used, for example, to analyze a single color imaging system or to transform the color response of one color imaging system to match the color response of another color imaging system. The color characterization technique uses a device-independent color space that includes reference vectors to compensate for perceptual effects attributable to, for example, the psychophysical response of a human viewer. These perceptual effects depend on, for example, lighting, background coloration, viewing angle, and/or other variables. By compensating for these effects, the technique accurately characterizes color imaging systems and improves the accuracy of mapping between color imaging systems.

FIG. 1 illustrates an example system 100 according to the present invention configured to characterize a color imaging system. The system 100 includes an appropriately-programmed computer arrangement 102. The computer arrangement 102 may be implemented using any of a variety of conventional resources, for example, a personal computer and CD-ROM based software. Other computer-based designs may be used as well. For example, the computer arrangement 102 may be implemented using a microprocessor that accesses a read-only memory (ROM) into which a software application program is loaded. The software application program may be incorporated, for example, in a color-management software package, such as that provided by the Rainbow™ color proofing system, commercially available from Imation, Inc., of St. Paul, Minn. Alternatively, the computer arrangement 102 may be incorporated as part of an intelligent printer. In such a configuration, the software application program is loaded, for example, into a printer memory.

The computer arrangement 102 obtains color data 104 that represents colors of output samples of a color imaging system to be characterized. The color imaging system may be, for example, a color printing system, a color display system, or a color projection system. It should be understood, however, that the color characterization technique may be applied to other types of color imaging systems according to the present invention. The color data 104 may be obtained, for example, directly from a color imaging system via a color measuring device 103 such as a calorimeter or a spectrophotometer, or by accessing a color data file stored in a color data memory 105. The dashed lines around the color measuring device 103 and the color data memory 105 of FIG. 1 indicate that either or both can provide the color data 104. For example, a colorimeter may be configured to measure color values for test patches formed on paper to characterize a color printing system.

The color measuring device 103 may comprise, for example, a color measurement system such as a Gretag™ SPM 50 color measurement device, commercially available from Gretag, Inc., of Regensdorf, Switzerland, or a densitometer such as an X-Rite color densitometer, commercially available from X-Rite, of Grandville, Mich. Alternatively, to characterize color display or projection systems, the color measuring device optionally comprises a video camera or digital camera. The color data 104 obtained by the color measuring device may be loaded into the color data memory as a color data file or directly loaded into a memory associated with the computer arrangement 102. The computer arrangement 102 can access the color data file to obtain previous color data 104 measured by the color measuring device. The color data memory optionally stores several color data files for a variety of different color imaging systems. The system 100 can thus be used to characterize a color imaging system selected from multiple color imaging systems having color data 104 stored in the color data memory.

The color data 104 represents, for example, CIE XYZ tristimulus values for each of a variety of color output samples generated by a color imaging system. Alternatively, the color data 104 may comprise other types of color values that can be converted to CIE XYZ tristimulus values. The color data 104 is selected to sample the range or gamut of colors that can be realized by the color imaging system under study. Selecting the color data 104 to sample the gamut broadly provides an improvement to the accuracy of the color characterization across the gamut.

The color data 104 typically includes data that the computer arrangement 102 uses in calculating a white reference vector 108 and a black reference vector 110. This data includes, for example, color values for an imaging base, such as paper, and color values for a maximum color output of the color imaging system. The CIE XYZ tristimulus values represent the relative amounts of primary color stimuli involved in matching colors within the CIE color system. The relative X, Y, and Z values are influenced, for example, by the power distribution of the illuminant, e.g., $D_{50}$, and the CIE standard observer function, e.g., 2° or 10°. Alternatively, the color data 104 may be, for example, RGB or CMYK data.

FIG. 2 illustrates an example color characterization method 200 for characterizing a color imaging system according to the present invention. In FIG. 2, at block 202, a system, such as the color characterization system 100 of FIG. 1, obtains CIE XYZ color values. This can be accomplished, for example, either directly from color data or through conversion from another type of color data. Next, as depicted at a block 204, the system calculates a set of values known as a black reference vector. The black reference vector compensates for black point adaptation, which occurs, for example, when a nominally black color displayed on a computer monitor appears black to the human eye despite significant stray light that imparts significantly non-zero tristimulus values to the nominally black color. The black reference vector is configurable and may be calculated using any of a variety of techniques appropriate for a particular imaging medium. For example, in certain application environments in which the black reference is near zero, a vector of zeros may be used as the black reference vector. In certain color printing systems using a cyan-magenta-yellow-black (CMYK) color space, the black reference vector may be defined using measured tristimulus values corresponding to cyan, magenta and yellow values of zero and a maximum black value. Alternatively, the black reference vector may be set using measured tristimulus values corresponding to maximum values of all four colorants or to cyan, magenta, yellow, and black values that yield maximum black ink coverage for a maximum black value. In certain other application environments using a red-green-blue (RGB) coordinate system, the black reference vector may be calculated from measured tristimulus values corresponding to red, green, and blue values of zero.

To characterize other color imaging systems, the color characterization system may calculate the black reference vector by multiplying tristimulus values of a perfect white diffuser ($X_n$, $Y_n$, $Z_n$) by a preselected scaling factor $\beta$. For a perfect black point, i.e., a black point having zero tristimulus values, $\beta$ is zero. For imperfect black points, $\beta$ is non-zero. Calculating the black reference vector using a scaling factor $\beta$ has been found particularly useful in transforming color values between certain color imaging systems, such as a color printing system for color printing on newsprint and the Rainbow™ color proofing system. Using measured tristimulus values to calculate the black reference vector has been found particularly useful for matching colors between a color display system for displaying colors on a color monitor and the Matchprint™ color proofing system, commercially available from Imation, Inc., of St. Paul, Minn.

Block 206 of FIG. 2 depicts the color characterization system calculating a white reference vector after calculating the black reference vector. It should be understood, however, that the system may alternatively calculate the white reference vector before calculating the black reference vector. The white reference vector is a vector defined by the tristimulus values $X_n$, $Y_n$, and $Z_n$ obtained for a white reference associated with the color imaging system. Any of a variety of white references may be used. For example, in some color imaging systems, such as those employing the CIELAB color space, the white reference vector comprises tristimulus values $X_N$, $Y_N$, and $Z_N$ for a perfectly diffuse white reflector, i.e., a medium exhibiting a maximum reflectance across the entire visible light spectrum. Using a perfectly diffuse white reflector to obtain the white reference vector yields relatively accurate results for most colors.

In certain other color imaging systems, the white reference vector is calculated from an imaging base vector defined by tristimulus values $X_b$, $Y_b$, and $Z_b$ obtained for an imaging base associated with the particular color imaging system under study. In a color printing system, for example, the imaging base is the printing substrate on which colorants are deposited to form an image. In a color display or color projection system, the imaging base is the white point produced by the display or projection system. This approach results in accurate reproduction of colors close to the media white.

As depicted at a block 208, after calculating the white reference vector, the color characterization system adjusts the white reference vector according to the particular color data being converted to the modified color space of the present invention. Adjusting the white reference vector ($X_n$, $Y_n$, $Z_n$) produces an adjusted white reference vector ($X_n'$, $Y_n'$, $Z_n'$). The adjusted white reference vector ($X_n'$, $Y_n'$, $Z_n'$) is used for converting the color data to modified color data in the modified color space.

The white reference vector ($X_n$, $Y_n$, $Z_n$) may be adjusted using a variety of techniques, including, for example, equations and/or estimation techniques. In a color coordinate system using L*, a*, and b* coordinates, the white reference vector ($X_n$, $Y_n$, $Z_n$) may be adjusted to generate the adjusted white reference vector ($X_n'$, $Y_n'$, $Z_n'$) according to the following equations:

$$X_n' = X_b(1 - \mathrm{sat}(X, X_{bp}, X_n)) + X_n \cdot \mathrm{sat}(X, X_{bp}, X_n)$$

$$Y_n' = Y_b(1 - \mathrm{sat}(Y, Y_{bp}, Y_n)) + Y_n \cdot \mathrm{sat}(Y, Y_{bp}, Y_n)$$

$$Z_n' = Z_b(1 - \mathrm{sat}(Z, Z_{bp}, Z_n)) + Z_n \cdot \mathrm{sat}(Z, Z_{bp}, Z_n)$$

where $$\mathrm{sat}(X, X_{bp}, X_n) = (X - X_n)/(X_{bp} - X_n)$$

$$\mathrm{sat}(Y, Y_{bp}, Y_n) = (Y - Y_n)/(Y_{bp} - Y_n)$$

$$\mathrm{sat}(Z, Z_{bp}, Z_n) = (Z - Z_n)/(Z_{bp} - Z_n)$$

$X_{bp}$, $Y_{bp}$, and $Z_{bp}$ are the tristimulus values comprising the black reference vector ($X_{bp}$, $Y_{bp}$, $Z_{bp}$). Alternatively, a vector ($X_{max}$, $Y_{max}$, $Z_{max}$) comprising the tristimulus values of the most saturated values in the particular imaging system may be substituted for the black reference vector ($X_{bp}$, $Y_{bp}$, $Z_{bp}$). To simplify calculations, the vector ($X_{max}$, $Y_{max}$, $Z_{max}$) can often be set to zero because the tristimulus values approach zero in the most saturated color, e.g., maximum black. Calculating saturation for each tristimulus value has been found to be more accurate in many cases than calculating a single saturation value for all three tristimulus values. For example, for certain colors, the human eye perceives significant saturation in one tristimulus value but low saturation in other tristimulus values. While the white reference vector may be adjusted using the functions described above, more complex functions can be used in certain application environments to produce improved visual matches. For example, the white reference vector can be adjusted using higher-order polynomial functions. Alternatively, the white reference vector can be adjusted as a function of lightness and colorfulness levels.

Next, at a block 210, the tristimulus color values are converted to modified color values in a modified color space having, for example, L*, a*, and b* coordinates. If the black reference vector ($X_{bp}$, $Y_{bp}$, $Z_{bp}$) is used in the block 208 to adjust the white reference vector, the modified color values can be calculated using, for example, the following equations:

$$L^*=116((Y-Y_{bp})/(Y_n'-Y_{bp}))^{1/3}-16$$

$$a^*=500[((X-X_{bp})/(X_n'-X_{bp}))^{1/3}-((Y-Y_{bp})/(Y_n'-Y_{bp}))^{1/3}]$$

$$b^*=200[((Y-Y_{bp})/(Y_n'-Y_{bp}))^{1/3}-((Z-Z_{bp})/(Z_n'-Z_{bp}))^{1/3}],$$

In application environments in which the vector ($X_{max}$, $Y_{max}$, $Z_{max}$) is used to adjust the white reference vector and is set to zero, the above equations reduce to the following forms:

$$L^*=116(Y/Y_n')^{1/3}-16$$

$$a^*=500[(X/X_n')^{1/3}-(Y/Y_n')^{1/3}]$$

$$b^*=200[(Y/Y_n')^{1/3}-(Z/Z_n')^{1/3}].$$

It should be understood that other device-independent color spaces may be used for converting the tristimulus color values. Additional examples of color spaces that may be used include, but are not limited to, the HUNTLAB, ICPF LAB, and RLAB color spaces.

According to another aspect of the present invention, color transformation is effected between different color imaging systems. FIG. 3 illustrates an example method for performing this transformation. The method may be performed, for example, by the color characterization system 100 of FIG. 1. As depicted at a block 302, color data is obtained for the respective color imaging systems between which the transformation is to be performed. At a block 304, a black reference vector is calculated for each color imaging system using equations similar to those used to calculate the black reference vector in connection with the block 204 of FIG. 2. Next, at a block 306, white reference vectors are calculated or estimated for each color imaging system. The white reference vectors can be calculated in a manner similar to that used for calculating the white reference vector in connection with the block 206 of FIG. 2. As discussed in connection with FIG. 2, this may be accomplished using an imaging base vector obtained for each color imaging system.

At a block 308, the white reference vectors for each color imaging system are adjusted according to the color data for each color imaging system. This adjustment is performed using equations similar to those used in connection with the block 208 of FIG. 2 or by estimation. The adjusted white reference vectors are then used to generate color transformation values that map color values between the color imaging systems. The color transformation values may be stored, for example, as entries in a table.

The various embodiments described above are provided by way of illustration only and should not be construed to limit the invention. Those skilled in the art will readily recognize various modifications and changes that may be made to the present invention without strictly following the example embodiments and applications illustrated and described herein, and without departing from the true spirit and scope of the present invention, which is set forth in the following claims.

What is claimed is:

1. A color characterization method for characterizing a color imaging system, the method comprising:

obtaining first color values representing output samples of the color imaging system;

converting the first color values into second color values in a device-independent color coordinate system using a white reference vector and a black reference vector; and adjusting the white reference vector using the black reference vector and the first color values being converted.

2. A color characterization method, according to claim 1, further comprising calculating the black reference vector as a function of a medium on which the output samples are formed.

3. A color characterization method, according to claim 2, further comprising defining the black reference vector as a vector of zeros.

4. A color characterization method, according to claim 2, further comprising defining the black reference vector using a maximum value in a black color channel of the color imaging system and minimum values in at least one additional color channel of the color imaging system.

5. A color characterization method, according to claim 2, further comprising defining the black reference vector using maximum values in color channels of the color imaging system.

6. A color characterization method, according to claim 1, further comprising generating the first color values using at least one of the following: a color measuring device, and a memory.

7. A color characterization method for characterizing a color imaging system, the method comprising:

obtaining first color values representing output samples of the color imaging system;

converting the first color values into second color values in a device-independent color coordinate system using a white reference vector and a black reference vector;

calculating the black reference vector as a function of an output medium associated with the color imaging system;

calculating the white reference vector using the black reference vector; and adjusting the white reference vector using the first color values being converted.

8. A color characterization method, according to claim 7, wherein the white reference vector for the device-independent color coordinate system uses white reference tristimulus values to compensate for certain perceptual effects.

9. A color characterization method, according to claim 8, further comprising:
converting the first color values into the second color values using transformations.

10. A color characterization method, according to claim 7, wherein the device-independent color coordinate system is an L*a*b* color coordinate system.

11. A color characterization method, according to claim 10, further comprising:
converting the first color values into the second color values using the equations $$L^* = 116((Y-Y_{bp})/(Y_n'-Y_{bp}))^{1/3} - 16$$

$$a^* = 500[((X-X_{bp})/(X_n'-X_{bp}))^{1/3} - ((Y-Y_{bp})/(Y_n'-Y_{bp}))^{1/3}]$$

$$b^* = 200[((Y-Y_{bp})/(Y_n'-Y_{bp}))^{1/3} - ((Z-Z_{bp})/(Z_n'-Z_{bp}))^{1/3}],$$

wherein
X, Y, and Z are tristimulus values for the first color values,
$X_n'$, $Y_n'$, and $Z_n'$ represent the white reference vector, and
$X_{bp}$, $Y_{bp}$, and $Z_{bp}$ represent the black reference vector; and
adjusting the white reference vector using the tristimulus values.

12. A color characterization method, according to claim 11, further comprising adjusting the white reference vector using the equations $$X_n' = X_b(1-\text{sat}(X,X_{bp},X_n)) + X_n \cdot \text{sat}(X,X_{bp},X_n)$$

$$Y_n' = Y_b(1-\text{sat}(Y,Y_{bp},Y_n)) + Y_n \cdot \text{sat}(Y,Y_{bp},Y_n)$$

$$Z_n' = Z_b(1-\text{sat}(Z,Z_{bp},Z_n)) + Z_n \cdot \text{sat}(Z,Z_{bp},Z_n),$$

wherein $$\text{sat}(X,X_{bp},X_n) = (X-X_n)/(X_{bp}-X_n)$$

$$\text{sat}(Y,Y_{bp},Y_n) = (Y-Y_n)/(Y_{bp}-Y_n)$$

$$\text{sat}(Z,Z_{bp},Z_n) = (Z-Z_n)/(Z_{bp}-Z_n)$$

$X_n$, $Y_n$, and $Z_n$ are tristimulus values for a perfect white diffuser under standard viewing conditions, and
$X_b$, $Y_b$, and $Z_b$ are tristimulus values for an imaging base associated with the color imaging system.

13. A color characterization method, according to claim 10, further comprising:
converting the first color values into the second color values using the equations $$L^* = 116(Y/Y_n')^{1/3} - 16$$

$$a^* = 500[(X/X_n')^{1/3} - (Y/Y_n')^{1/3}]$$

$$b^* = 200[(Y/Y_n')^{1/3} - (Z/Z_n')^{1/3}],$$

wherein
X, Y, and Z are tristimulus values for the first color values, and
$X_n'$, $Y_n'$, and $Z_n'$ represent the white reference vector; and
adjusting the white reference vector using the tristimulus values.

14. A color characterization method, according to claim 13, further comprising adjusting the white reference vector using the equations $$X_n' = X_b(1-\text{sat}(X,X_{max},X_n)) + X_n \cdot \text{sat}(X,X_{max},X_n)$$

$$Y_n' = Y_b(1-\text{sat}(Y,Y_{max},Y_n)) + Y_n \cdot \text{sat}(Y,Y_{max},Y_n)$$

$$Z_n' = Z_b(1-\text{sat}(Z,Z_{max},Z_n)) + Z_n \cdot \text{sat}(Z,Z_{max},Z_n),$$

wherein $$\text{sat}(X,X_{max},X_n) = (X-X_n)/(X_{max}-X_n)$$

$$\text{sat}(Y,Y_{max},Y_n) = (Y-Y_n)/(Y_{max}-Y_n)$$

$$\text{sat}(Z,Z_{max},Z_n) = (Z-Z_n)/(Z_{max}-Z_n)$$

$X_n$, $Y_n$, and $Z_n$ are tristimulus values for a perfect white diffuser under standard viewing conditions,
$X_{max}$, $Y_{max}$, and $Z_{max}$ are tristimulus values for a color having a maximum saturation associated with the color imaging system, and
$X_b$, $Y_b$, and $Z_b$ are tristimulus values for an imaging base associated with the color imaging system.

15. A color characterization method, according to claim 7, further comprising generating the first color values using at least one of the following: a color measuring device, and a memory.

16. For use in characterizing a color imaging system, a color characterization arrangement comprising:
means for obtaining first color values representing output samples of the color imaging system;
means for converting the first color values into second color values in a device-independent color coordinate system using a white reference vector and a black reference vector; and
adjusting the white reference vector using the black reference vector and the first color values being converted.

17. For use in characterizing a color imaging system, a color characterization arrangement comprising:
a computer arrangement, configured and arranged to receive first color values in a color coordinate system, the first color values representing output samples of the color imaging system; and
a first memory, responsive to the computer arrangement and configured and arranged to store second color values in a device-independent color coordinate system,
the computer arrangement being further configured and arranged to convert the first color values into the second color values using a white reference vector and a black reference vector, and to adjust the white reference vector using the black reference vector and the first color values being converted.

18. A color characterization arrangement, according to claim 17, wherein the computer arrangement is further configured and arranged to define the black reference vector as a vector of zeros.

19. A color characterization arrangement, according to claim 17, wherein the computer arrangement is further configured and arranged to define the black reference vector using a maximum value in a black color channel of the color imaging system and minimum values in at least one additional color channel of the color imaging system.

20. A color characterization arrangement, according to claim 17, wherein the computer arrangement is further configured and arranged to define the black reference vector using maximum values in color channels of the color imaging system.

21. A color characterization arrangement, according to claim 17, wherein the white reference vector for the device-independent color coordinate system uses white reference tristimulus values to compensate for certain perceptual effects.

22. A color characterization arrangement, according to claim 17, wherein the computer arrangement is further configured and arranged to:
convert the first color values into the second color values using transformations.

23. A color characterization arrangement, according to claim 17, wherein the device-independent color coordinate system is an L*a*b* color coordinate system.

24. A color characterization arrangement, according to claim 23, wherein the computer arrangement is further configured and arranged to:
convert the first color values into the second color values using the equations $$L^* = 116((Y-Y_{bp})/(Y_n'-Y_{bp}))^{1/3} - 16$$

$$a^* = 500[((X-X_{bp})/(X_n'-X_{bp}))^{1/3} - ((Y-Y_{bp})/(Y_n'-Y_{bp}))^{1/3}]$$

$$b^* = 200[((Y-Y_{bp})/(Y_n'-Y_{bp}))^{1/3} - ((Z-Z_{bp})/(Z_n'-Z_{bp}))^{1/3}],$$

wherein

X, Y, and Z are tristimulus values for the first color values, $X_n'$, $Y_n'$, and $Z_n'$ represent the white reference vector, and $X_{bp}$, $Y_{bp}$, and $Z_{bp}$ represent the black reference vector; and adjust the white reference vector using the tristimulus values.

25. A color characterization arrangement, according to claim 24, wherein the computer arrangement is further configured and arranged to adjust the white reference vector using the equations $$X_n' = X_b(1-\text{sat}(X,X_{bp},X_n)) + X_n \cdot \text{sat}(X,X_{bp},X_n)$$

$$Y_n' = Y_b(1-\text{sat}(Y,Y_{bp},Y_n)) + Y_n \cdot \text{sat}(Y,Y_{bp},Y_n)$$

$$Z_n' = Z_b(1-\text{sat}(Z,Z_{bp},Z_n)) + Z_n \cdot \text{sat}(Z,Z_{bp},Z_n)$$

wherein $$\text{sat}(X,X_{bp},X_n) = (X-X_n)/(X_{bp}-X_n)$$

$$\text{sat}(Y,Y_{bp},Y_n) = (Y-Y_n)/(Y_{bp}-Y_n)$$

$$\text{sat}(Z,Z_{bp},Z_n) = (Z-Z_n)/(Z_{bp}-Z_n)$$

$X_n$, $Y_n$, and $Z_n$ are tristimulus values for a perfect white diffuser under standard viewing conditions, and $X_b$, $Y_b$, and $Z_b$ are tristimulus values for an imaging base associated with the color imaging system.

26. A color characterization arrangement, according to claim 23, wherein the computer arrangement is further configured and arranged to:
convert the first color values into the second color values using the equations $$L^* = 116(Y/Y_n')^{1/3} - 16$$

$$a^* = 500[(X/X_n')^{1/3} - (Y/Y_n')^{1/3}]$$

$$b^* = 200[(Y/Y_n')^{1/3} - (Z/Z_n')^{1/3}],$$

wherein

X, Y, and Z are tristimulus values for the first color values, and $X_n'$, $Y_n'$, and $Z_n'$ represent the white reference vector; and adjust the white reference vector using the tristimulus values.

27. A color characterization arrangement, according to claim 26, wherein the computer arrangement is further configured and arranged to adjust the white reference vector using the equations $$X_n' = X_b(1-\text{sat}(X,X_{max},X_n)) + X_n \cdot \text{sat}(X,X_{max},X_n)$$

$$Y_n' = Y_b(1-\text{sat}(Y,Y_{max},Y_n)) + Y_n \cdot \text{sat}(Y,Y_{max},Y_n)$$

$$Z_n' = Y_b(1-\text{sat}(Z,Z_{max},Z_n)) + Z_n \cdot \text{sat}(Z,Z_{max},Z_n),$$

wherein $$\text{sat}(X,X_{max},X_n) = (X-X_n)/(X_{max}-X_n)$$

$$\text{sat}(Y,Y_{max},Y_n) = (Y-Y_n)/(Y_{max}-Y_n)$$

$$\text{sat}(Z,Z_{max},Z_n) = (Z-Z_n)/(Z_{max}-Z_n)$$

$X_n$, $Y_n$, and $Z_n$ are tristimulus values for a perfect white diffuser under standard viewing conditions, $X_{max}$, $Y_{max}$, and $Z_{max}$ are tristimulus values for a color having a maximum saturation associated with the color imaging system, and $X_b$, $Y_b$, and $Z_b$ are tristimulus values for an imaging base associated with the color imaging system.

28. A color characterization arrangement, according to claim 17, further comprising a second memory, configured and arranged to provide the first color values to the computer arrangement.

29. A color characterization arrangement, according to claim 17, further comprising a color measuring instrument, configured and arranged to:
obtain the first color values from a sample; and
provide the first color values to the computer arrangement.

30. For use in characterizing a color imaging system, a data storage medium storing a computer-executable program configured and arranged to, when executed,
obtain first color values representing output samples of the color imaging system,
convert the first color values into second color values in a device-independent color coordinate system using a white reference vector and a black reference vector, and
adjust the white reference vector using the black reference vector and the first color values being converted.

31. A data storage medium, according to claim 30, wherein the computer-executable program is further configured and arranged to, when executed, calculate the black reference vector as a function of a medium on which the output samples are formed.

32. A data storage medium, according to claim 31, wherein the computer-executable program is configured and arranged to, when executed, define the black reference vector as a vector of zeros.

33. A data storage medium, according to claim 31, wherein the computer-executable program is configured and arranged to, when executed, define the black reference vector using a maximum value in a black color channel of the color imaging system and minimum values in at least one additional color channel of the color imaging system.

34. A data storage medium, according to claim 31, wherein the computer-executable program is configured and arranged to, when executed, define the black reference vector using maximum values in color channels of the color imaging system.

35. A data storage medium, according to claim 30, wherein the white reference vector for the device-independent color coordinate system uses white reference tristimulus values to compensate for certain perceptual effects.

36. A data storage medium, according to claim 35, wherein the computer-executable program is further configured and arranged to, when executed, convert the first color values into the second color values using transformations.

37. A data storage medium, according to claim 30, wherein the device-independent color coordinate system is an L*a*b* color coordinate system.

38. A data storage medium, according to claim 37, wherein the computer-executable program is further configured and arranged to, when executed, convert the first color values into the second color values using the equations $$L=116((Y-Y_{bp})/(Y_n'-Y_{bp}))^{1/3}-16$$

$$a^*=500[((X-X_{bp})/(X_n'-X_{bp}))^{1/3}-((Y-Y_{bp})/(Y_n'-Y_{bp}))^{1/3}]$$

$$b^*=200[((Y-Y_{bp})/(Y_n'-Y_{bp}))^{1/3}-((Z-Z_{bp})/(Z_n'-Z_{bp}))^{1/3}],$$

wherein
X, Y, and Z are tristimulus values for the first color values,
$X_n'$, $Y_n'$, and $Z_n'$ represent the white reference vector, and
$X_{bp}$, $Y_{bp}$, and $Z_{bp}$ represent the black reference vector, and adjust the white reference vector using the tristimulus values.

39. A data storage medium, according to claim 38, wherein the computer-executable program is further configured and arranged to, when executed, adjust the white reference vector using the equations $$X_n'=X_b(1-\text{sat}(X,X_{bp},X_n))+X_n\cdot\text{sat}(X,X_{bp},X_n)$$

$$Y_n'=Y_b(1-\text{sat}(Y,Y_{bp},Y_n))+Y_n\cdot\text{sat}(Y,Y_{bp},Y_n)$$

$$Z_n'=Z_b(1-\text{sat}(Z,Z_{bp},Z_n))+Z_n\cdot\text{sat}(Z,Z_{bp},Z_n),$$

wherein $$\text{sat}(X,X_{bp},X_n)=(X-X_n)/(X_{bp}-X_n)$$

$$\text{sat}(Y,Y_{bp},Y_n)=(Y-Y_n)/(Y_{bp}-Y_n)$$

$$\text{sat}(Z,Z_{bp},Z_n)=(Z-Z_n)/(Z_{bp}-Z_n)$$

$X_n$, $Y_n$, and $Z_n$, are tristimulus values for a perfect white diffuser under standard viewing conditions, and
$X_b$, $Y_b$, and $Z_b$ are tristimulus values for an imaging base associated with the color imaging system.

40. A data storage medium, according to claim 37, wherein the computer-executable program is further configured and arranged to, when executed, convert the first color values into the second color values using the equations $$L^*=116(Y/Y_n')^{1/3}-16$$

$$a^*=500[(X/X_n')^{1/3}-(Y/Y_n')^{1/3}]$$

$$b^*=200[(Y/Y_n')^{1/3}-(Z/Z_n')^{1/3}],$$

wherein
X, Y, and Z are tristimulus values for the first color values, and
$X_n'$, $Y_n'$, and $Z_n'$ represent the white reference vector, and adjust the white reference vector using the tristimulus values.

41. A data storage medium, according to claim 40, wherein the computer-executable program is further configured and arranged to, when executed, adjust the white reference vector using the equations $$X_n'=X_b(1-\text{sat}(X,X_{max},X_n))+X_n\cdot\text{sat}(X,X_{max},X_n)$$

$$Y_n'=Y_b(1-\text{sat}(Y,Y_{max},Y_n))+Y_n\cdot\text{sat}(Y,Y_{max},Y_n)$$

$$Z_n'=Z_b(1-\text{sat}(Z,Z_{max},Z_n))+Z_n\cdot\text{sat}(Z,Z_{max},Z_n),$$

wherein $$\text{sat}(X,X_{max},X_n)=(X-X_n)/(X_{max}-X_n)$$

$$\text{sat}(Y,Y_{max},Y_n)=(Y-Y_n)/(Y_{max}-Y_n)$$

$$\text{sat}(Z,Z_{max},Z_n)=(Z-Z_n)/(Z_{max}-Z_n)$$

$X_n$, $Y_n$, and $Z_n$ are tristimulus values for a perfect white diffuser under standard viewing conditions,
$X_{max}$, $Y_{max}$, and $Z_{max}$ are tristimulus values for a color having a maximum saturation associated with the color imaging system, and
$X_b$, $Y_b$, and $Z_b$ are tristimulus values for an imaging base associated with the color imaging system.

42. A data storage medium, according to claim 30, wherein the computer-executable program is further configured and arranged to, when executed, store the second color values in a memory.

43. A color transformation method for performing a color transformation between first and second color imaging systems, the color transformation method comprising:

generating first and second color values respectively representing output samples of the first and second color imaging systems;

converting the first and second color values respectively into third and fourth color values using a device-independent color coordinate system;

calculating a black reference vector from a medium on which the output samples are formed and a white reference vector from the black reference vector;

adjusting the white reference vector using the first and second color values being converted; and generating color transformation values using the third and fourth color values.

44. A color characterization method, according to claim 43, wherein the white reference vector of the device-independent color coordinate system uses white reference tristimulus values to compensate for certain perceptual effects.

45. A color characterization method, according to claim 44, further comprising:

converting the first color values into the second color values using transformations.

46. A color transformation method, according to claim 43, wherein the color coordinate system is an L*a*b* color coordinate system.

47. A color transformation method, according to claim 46, further comprising:

converting the first color values into the third color values using the equations $$L^* = 116((Y_1 - Y_{bp1})/(Y_{n1}' - Y_{bp1}))^{1/3} - 16$$

$$a^* = 500[((X_1 - X_{bp1})/(X_{n1}' - X_{bp1}))^{1/3} - ((Y_1 Y_{bp1})/(Y_{n1}' - Y_{bp1}))^{1/3}]$$

$$b^* = 200[((Y_1 - Y_{bp1})/(Y_{n1}' - Y_{bp1}))^{1/3} - ((Z_1 - Z_{bp1})/(Z_{n1}' - Z_{bp1}))^{1/3}],$$

wherein
  $X_1$, $Y_1$, and $Z_1$ are tristimulus values for the first color values,
  $X_{bp1}$, $Y_{bp1}$, and $Z_{bp1}$ are black tristimulus values for the first color imaging system, and
  $X_{n1}'$, $Y_{n1}'$, and $Z_{n1}'$ are white reference tristimulus values for the first color imaging system;

converting the second color values into the fourth color values using the equations $$L^* = 116((Y_2 - Y_{bp2})/(Y_{n2}' - Y_{bp2}))^{1/3} - 16$$

$$a^* = 500[((X_2 - X_{bp2})/(X_{n2}' - X_{bp2}))^{1/3} - ((Y_2 - Y_{bp2})/(Y_{n2}' - Y_{bp2}))^{1/3}]$$

$$b^* = 200[((Y_2 - Y_{bp2})/(Y_{n2}' - Y_{bp2}))^{1/3} - ((Z_2 - Z_{bp2})/(Z_{n2}' - Z_{bp2}))^{1/3}],$$

wherein
  $X_2$, $Y_2$, and $Z_2$ are tristimulus values for the second color values,
  $X_{bp2}$, $Y_{bp2}$, and $Z_{bp2}$ are black tristimulus values for the second color imaging system, and
  $X_{n2}'$, $Y_{n2}'$, and $Z_{n2}'$ are white tristimulus values for the second color imaging system; and adjusting the white reference vector using the black tristimulus values for the first and second color imaging systems.

48. A color transformation method, according to claim 47, further comprising:

adjusting the white reference tristimulus values for the first color imaging system using the equations $$X_{n1}' = X_{b1}(1 - \text{sat}(X_1, X_{bp1}, X_{n1})) + X_{n1} \cdot \text{sat}(X_1, X_{bp1}, X_{n1})$$

$$Y_{n1}' = Y_{b1}(1 - \text{sat}(Y_1, Y_{bp1}, Y_{n1})) + Y_{n1} \cdot \text{sat}(Y_1, Y_{bp1}, Y_{n1})$$

$$Z_{n1}' = Z_{b1}(1 - \text{sat}(Z_1, Z_{bp1}, Z_{n1})) + Z_{n1} \cdot \text{sat}(Z_1, Z_{bp1}, Z_{n1}),$$

wherein $$\text{sat}(X_1, X_{bp}, X_n) = (X_1 - X_{n1})/(X_{bp1} - X_{n1})$$

$$\text{sat}(Y_1, Y_{bp}, Y_n) = (Y_1 - Y_{n1})/(Y_{bp1} - Y_{n1})$$

$$\text{sat}(Z_1, Z_{bp}, Z_{n1}) = (Z_1 - Z_{n1})/(Z_{bp1} - Z_{n1})$$

$X_{n1}$, $Y_{n1}$, and $Z_{n1}$ are tristimulus values for a perfect white diffuser associated with the first color imaging system under standard viewing conditions, and $X_{b1}$, $Y_{b1}$, and $Z_{b1}$ are tristimulus values for an imaging base associated with the first color imaging system; and adjusting the white reference tristimulus values for the second color imaging system using the equations $$X_{n2}' = X_{b2}(1 - \text{sat}(X_2, X_{bp2}, X_{n2})) + X_{n2} \cdot \text{sat}(X_2, X_{bp2}, X_{n2})$$

$$Y_{n2}' = Y_{b2}(1 - \text{sat}(Y_2, Y_{bp2}, Y_{n2})) + Y_{n2} \cdot \text{sat}(Y_2, Y_{bp2}, Y_{n2})$$

$$Z_{n2}' = Z_{b2}(1 - \text{sat}(Z_2, Z_{bp2}, Z_{n2})) + Z_{n2} \cdot \text{sat}(Z_2, Z_{bp2}, Z_{n2}),$$

wherein $$\text{sat}(X_2, X_{bp}, X_n) = (X_2 - X_{n2})/(X_{bp2} - X_{n2})$$

$$\text{sat}(Y_2, Y_{bp}, Y_n) = (Y_2 - Y_{n2})/(Y_{bp2} - Y_{n2})$$

$$\text{sat}(Z_2, Z_{bp2}, Z_{n2}) = (Z_2 - Z_{n2})/(Z_{bp2} - Z_{n2})$$

$X_{n2}$, $Y_{n2}$, and $Z_{n2}$ are tristimulus values for a perfect white diffuser associated with the second color imaging system under standard viewing conditions, and $X_{b2}$, $Y_{b2}$, and $Z_{b2}$ are tristimulus values for an imaging base associated with the second color imaging system.

49. A color characterization method, according to claim 46, further comprising:

converting the first color values into the third color values using the equations $$L^* = 116(Y_1/Y_{n1}')^{1/3} - 16$$

$$a^* = 500[(X_1/X_{n1}')^{1/3} - (Y_1/Y_{n1}')^{1/3}]$$

$$b^* = 200[(Y_1/Y_{n1}')^{1/3} - (Z_1/Z_{n1}')^{1/3}],$$

wherein
  $X_1$, $Y_1$, and $Z_1$ are tristimulus values for the first color values, and
  $X_{n1}'$, $Y_{n1}'$, and $Z_{n1}'$ are white reference tristimulus values for the first color imaging system;

converting the second color values into the fourth color values using the equations $$L^* = 116(Y_2/Y_{n2}')^{1/3} - 16$$

$$a^* = 500[(X_2/X_{n2}')^{1/3} - (Y_2/Y_{n2}')^{1/3}]$$

$$b^* = 200[(Y_2/Y_{n2}')^{1/3} - (Z_2/Z_{n2}')^{1/3}],$$

wherein
  $X_2$, $Y_2$, and $Z_2$ are tristimulus values for the second color values, and
  $X_{n2}'$, $Y_{n2}'$, and $Z_{n2}'$ are white reference tristimulus values for the second color imaging system; and adjusting the white reference vector using the black tristimulus values for the first and second color imaging systems.

50. A color transformation method, according to claim 49, further comprising:

adjusting the white reference tristimulus values for the first color imaging system using the equations $$X_{n1}' = X_{b1}(1 - \text{sat}(X_1, X_{max1}, X_{n1})) + X_{n1} \cdot \text{sat}(X_1, X_{max1}, X_{n1})$$

$$Y_{n1}' = Y_{b1}(1 - \text{sat}(Y_1, Y_{max1}, Y_{n1})) + Y_{n1} \cdot \text{sat}(Y_1, Y_{max1}, Y_{n1})$$

$$Z_{n1}' = Z_{b1}(1 - \text{sat}(Z_1, Z_{max1}, Z_{n1})) + Z_{n1} \cdot \text{sat}(Z_1, Z_{max1}, Z_{n1})$$

wherein $$\text{sat}(X_1, X_{max1}, X_{n1}) = (X_1 - X_{n1})/(X_{max1} - X_{n1})$$

$$\text{sat}(Y_1, Y_{max1}, Y_{n1}) = (Y_1 - Y_{n1})/(Y_{max1} - Y_{n1})$$

$$\text{sat}(Z_1, Z_{max1}, Z_{n1}) = (Z_1 - Z_{n1})/(Z_{max1} - Z_{n1})$$

$X_{n1}$, $Y_{n1}$, and $Z_{n1}$ are tristimulus values for a perfect white diffuser associated with the first color imaging system under standard viewing conditions, $X_{max1}$, $Y_{max1}$, and $Z_{max1}$ are tristimulus values for a color having a maximum saturation associated with the first color imaging system, and $X_{b1}$, $Y_{b1}$, and $Z_{b1}$ are tristimulus values for an imaging base associated with the first color imaging system; and adjusting the white reference tristimulus values for the second color imaging system using the equations $$X_{n2}'=X_{b2}(1-\text{sat}(X_2,X_{max2},X_{n2}))+X_{n2}\cdot\text{sat}(X_2,X_{max2},X_{n2})$$

$$Y_{n2}'=Y_{b2}(1-\text{sat}(Y_2,Y_{max2},Y_{n2}))+Y_{n2}\cdot\text{sat}(Y_2,Y_{max2},Y_{n2})$$

$$Z_{n2}'=Z_{b2}(1-\text{sat}(Z_2,Z_{max2},Z_{n2}))+Z_{n2}\cdot\text{sat}(Z_2,Z_{max2},Z_{n2}),$$

wherein $$\text{sat}(X_2,X_{max2},X_{n2})=(X_2-X_{n2})/(X_{max2}-X_{n2})$$

$$\text{sat}(Y_2,Y_{max2},Y_{n2})=(Y_2-Y_{n2})/(Y_{max2}-Y_{n2})$$

$$\text{sat}(Z_2,Z_{max2},Z_{n2})=(Z_2-Z_{n2})/(Z_{max2}-Z_{n2})$$

$X_{n2}$, $Y_{n2}$, and $Z_{n2}$ are tristimulus values for a perfect white diffuser associated with the second color imaging system under standard viewing conditions, $X_{max2}$, $Y_{max2}$, and $Z_{max2}$ are tristimulus values for a color having a maximum saturation associated with the second color imaging system, and $X_{b2}$, $Y_{b2}$, and $Z_{b2}$ are tristimulus values for an imaging base associated with the second color imaging system.

51. For use in performing a color transformation between first and second color imaging systems, a color transformation arrangement comprising:

means for obtaining first color values representing output samples of the first color imaging system;

means for generating second color values representing output samples of the second color imaging system;

means for converting the first color values into third color values using a device-independent color coordinate system;

means for converting the second color values into fourth color values using the color coordinate system;

means for calculating a black reference vector from a medium on which the output samples are formed and a white reference vector from the black reference vector;

means for adjusting the white reference vector using the first and second color values being converted; and means for generating color transformation values using the third and fourth color values.

52. A method for characterizing a color imaging system, the method comprising:

obtaining first color values representing output of the system;

converting the first color values to second color values using a white reference vector for the system; and adjusting the white reference vector as a function of both a black reference vector for the system and the first color values being converted.

53. The method of claim 52, further comprising calculating the black reference vector as a function of a medium on which the output of the system is formed.

54. The method of claim 52, further comprising defining the black reference vector as a vector of zeros.

55. The method of claim 52, further comprising defining the black reference vector using a maximum value in a black color channel of the color imaging system and minimum values in at least one additional color channel of the color imaging system.

56. The method of claim 52, further comprising defining the black reference vector using maximum values in color channels of the color imaging system.

57. A color characterization method for characterizing a color imaging system, the method comprising:

obtaining first color values in a color coordinate system using output samples of the color imaging system, the first color values representing colors of the output samples of the color imaging system; and converting the first color values into second color values in a device-independent color coordinate system using a white reference vector and a black reference vector according to the following equations:

$$L^*=116((Y-Y_{bp})/(Y_n'-Y_{bp}))^{1/3}-16$$

$$a^*=500[((X-X_{bp})/(X_n'-X_{bp}))^{1/3}-((Y-Y_{bp})/(Y_n'-Y_{bp}))^{1/3}]$$

$$b^*=200[((Y-Y_{bp})/(Y_n'-Y_{bp}))^{1/3}-((Z-Z_{bp})/(Z_n'-Z_{bp}))^{1/3}],$$

wherein

X, Y, and Z are tristimulus values for the first color values, $X_n'$, $Y_n'$, and $Z_n'$ represent a white reference vector, and $X_{bp}$, $Y_{bp}$, and $Z_{bp}$ represent a black reference vector; and adjusting the white reference vector using the tristimulus values.

58. The method of claim 57, further comprising adjusting the white reference vector using the equations:

$$X_n'=X_b(1-\text{sat}(X,X_{bp},X_n))+X_n\cdot\text{sat}(X,X_{bp},X_n),$$

$$Y_n'=Y_b(1-\text{sat}(Y,Y_{bp},Y_n))+Y_n\cdot\text{sat}(Y,Y_{bp},Y_n),$$

$$Z_n'=Z_b(1-\text{sat}(Z,Z_{bp},Z_n))+Z_n\cdot\text{sat}(Z, Z_{bp},Z_n),$$

wherein $$\text{sat}(X,X_{bp},X_n)=(X-X_n)/(X_{bp}-X_n),$$

$$\text{sat}(Y,Y_{bp},Y_n)=(Y-Y_n)/(Y_{bp}-Y_n),$$

$$\text{sat}(Z,Z_{bp},Z_n)=(Z-Z_n)/(Z_{bp}-Z_n),$$

$X_n$, $Y_n$, and $Z_n$ are tristimulus values for a perfect white diffuser under standard viewing conditions, and $X_b$, $Y_b$, and $Z_b$ are tristimulus values for an imaging medium associated with the color imaging system.

* * * * *